United States Patent [19]
Spurlin

[11] Patent Number: 5,547,068
[45] Date of Patent: Aug. 20, 1996

[54] CENTER BEAM TWO MASS VIBRATORY DEVICE

[76] Inventor: W. V. Spurlin, 202 Locust St., Indiana, Pa. 15701

[21] Appl. No.: 518,596

[22] Filed: Aug. 11, 1995

[51] Int. Cl.$^6$ .................................................. B65G 27/28
[52] U.S. Cl. ............................................ 198/760; 198/770
[58] Field of Search .................................. 198/760, 767, 198/770, 771, 759

[56] References Cited

U.S. PATENT DOCUMENTS

| | | |
|---|---|---|
| 3,089,582 | 12/1960 | Musschoot et al. . |
| 3,130,831 | 6/1961 | Musschoot . |
| 3,203,264 | 8/1965 | Evans .................................... 198/770 X |
| 3,212,345 | 10/1965 | Rechenberg et al. ............... 198/770 X |
| 3,348,664 | 10/1967 | Renner .................................. 198/770 X |
| 3,396,294 | 10/1967 | Makino . |
| 3,703,236 | 7/1970 | Spurlin et al. . |
| 3,796,299 | 7/1971 | Musschoot . |
| 4,015,705 | 4/1977 | Dumbaugh .............................. 198/770 |
| 4,168,774 | 9/1979 | Musschoot .......................... 198/770 X |
| 4,218,929 | 8/1980 | Spurlin . |

OTHER PUBLICATIONS

N. Makino et al. *RFH Type Vibrating Feeder*. Shinko Electric Journal. No. 2, vol. 14–42. May 1969.
N. Makino et al. *RFH Type Vibrating Feeder*. Shinko Electric Journal. No. 3, vol. 14–43 Jan. 1969.
*AJAX Vibrating Materials Handling Equipment and Systems*. Bulletin FP–88 (no date).
Dumbaugh. *Introducing Vibratory Machines for Material Handling*. Bulletin No. IMH–1. May 1994.
*Shinko Feeders Bulletin* (no date).

Primary Examiner—D. Glenn Dayoan
Attorney, Agent, or Firm—Randy W. Lacasse

[57] ABSTRACT

A vibratory device operating as a two mass vibrating system having an exciter mass and a work member mass spring coupled and supported by isolator springs and operating at a frequency less than the natural frequency of the system. Two or more cylindrical elastomer springs are mounted on a center beam of the work member having a spring rate in the shear direction for setting the required natural frequency and also provide a spring rate in the compression direction that will have a natural frequency substantially above the natural frequency in the shear direction. The cylindrical elastomer springs mounted to a single rigid center beam provides flexibility of design for a specific work member application.

10 Claims, 2 Drawing Sheets

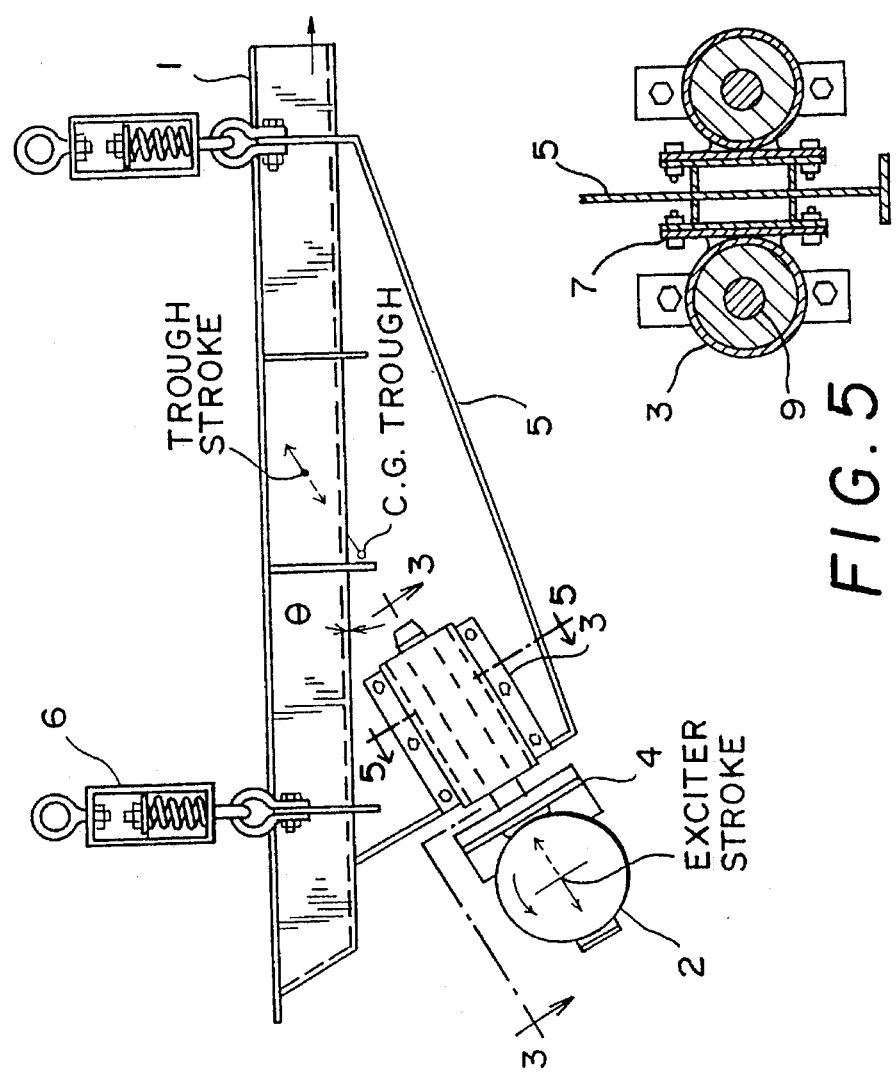
FIG. 1
FIG. 5
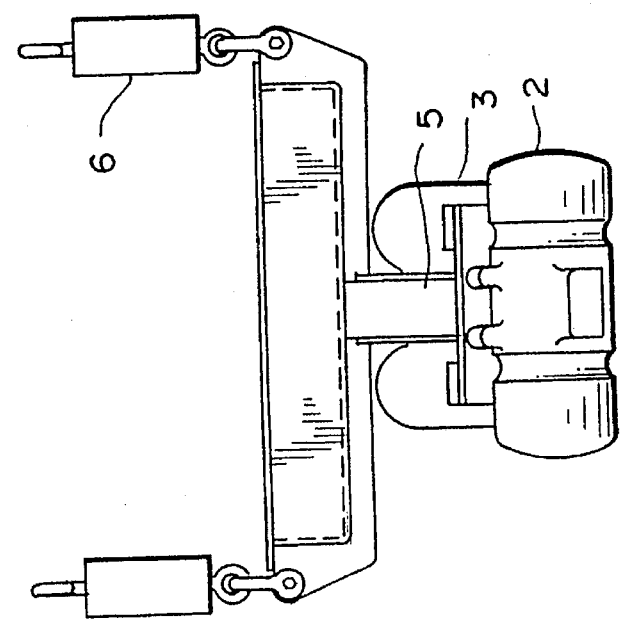
FIG. 2

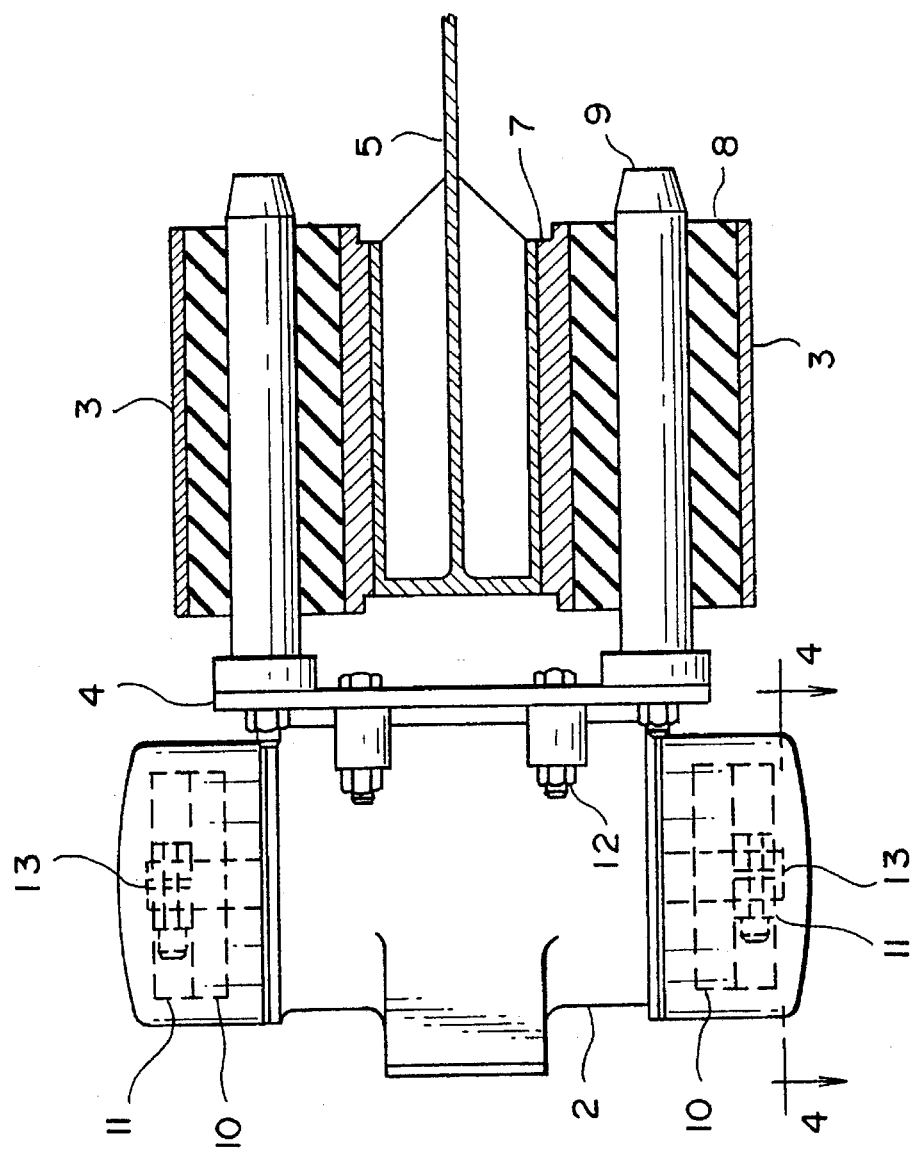
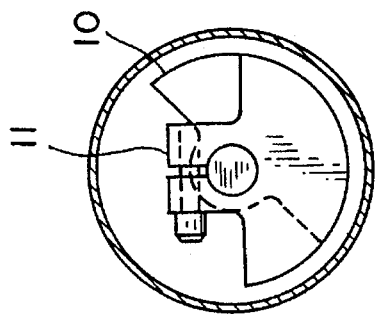

5,547,068

CENTER BEAM TWO MASS VIBRATORY DEVICE

BACKGROUND OF THE INVENTION

1. Field of Invention

The present invention relates to the field of vibrating work conveyors. More specifically the present invention relates to a vibratory device operable as a two mass vibrating system moving bulk material in a linear direction as a feeder, conveyor, packer, screen, grizzley and foundry shakeout.

The flow rate of feeding can be selected to be either at a set fixed rate or varied by a suitable electronic power supply controller.

2. Discussion of Prior Art

Vibratory devices operating as a two mass vibrating system are well known in the prior art and are found frequently in industry as product feeding mechanisms.

The common design feature of prior art two mass vibratory devices is the particular arrangement and type of springs used to couple the exciter mass and the work member mass. The prior art uses a plurality of wing plates(typically in geometrically paired sets) on the work member required for attaching the spring system of an exciter to the work member.

The prior art fails to provide for a single center beam supported work member. A single center beam has many advantages over the prior art as will become apparent in the attached specification, claims and drawings.

SUMMARY OF THE INVENTION

It is an object of the present invention to provide for a single beam two mass vibratory device for attachment to a work member.

It is also an object of the present invention to provide a structure which will obtain the minimum height for the total vibratory device assembly.

It is also an object of the present invention to provide for a unique method of attachment of cylindrical elastomer springs.

It is also an object of the present invention to reduce the stress at exciter connection points.

These and other objects of the invention will become evident when taken in conjunction with the drawings, claims and description of the preferred embodiments of the invention.

The present invention of a vibratory device for driving a work member for feeding, conveying, etc., and is operable as a two mass vibrating system. The device has a work member which is designed with a single center beam on which is mounted at least two cylindrical elastomer springs having center shafts for connection to the exciter which includes a mounting plate and a double shaft electric motor with eccentric weights on each end.

The single center beam provides a very rigid simple design of the work member. Also, mounting the cylindrical elastomer springs on the center beam eliminates the high stress concentration at the connecting point to the exciter.

All components are separate units allowing flexibility in sizing to suit the requirements of a specific application.

As in all two mass vibrating devices, feed rate of material is determined by the stroke of the work member which can be set by using a variable frequency controller is the preferred method of obtaining variable feed rate.

BRIEF DESCRIPTION OF THE DRAWINGS

FIG. 1 illustrates a side elevation of the electromechanical Vibratory Feeder Assembly of the present invention.

FIG. 2 illustrates an end view of the electromechanical Vibratory feeder assembly as shown in FIG. 1.

FIG. 3 illustrates a cross-sectional view taken at line 3—3 of FIG. 1.

FIG. 4 illustrates a cross-sectional view taken at line 4—4 of FIG. 3.

FIG. 5 illustrates a right-end view of FIG. 3.

DESCRIPTION OF THE PREFERRED EMBODIMENTS

FIG. 1, shows a trough 1 for feeding bulk material coupled to an electric motor eccentric weight exciter 2 by means of cylindrical elastomer springs 3 and mounting plate 4. Trough 1 represents any work member requiring a forward conveying vibratory action such as large and small feeders, conveyers, screens, grizzleys, foundry shakeouts, and packers or equivalents thereof.

FIG. 2 shows an end view arrangement of the cylindrical elastomer springs 3 relative to trough single center beam 5 and the horizontal position of exciter 2 which in FIG. 1 is located on a line passing approximately through the center of gravity of the trough and at a predetermined angle θ to the conveying surface as required by the application.

FIG. 1 shows the complete feeder assembly on isolator springs 6 which are typically required for operation of two mass vibrating systems. FIG. 1 also shows the opposite direction of the strokes on both trough 1 and exciter 2. The magnitude of each stroke is dependent on the ratio of the two masses and the natural frequency of the vibrating system.

FIG. 3 shows exciter 2 on mounting plate 4 coupled to single center beam 5 by means of two cylindrical elastomer spring assemblies 3. Cylindrical elastomer spring assembly comprises an outer flanged housing 7 suitable for bolting to center beam 5, a tubular low damping elastomer 8 and spring connecting shaft 9 which is bolted to mounting plate 4.

Low damping elastomer 8 is bonded to flanged housing 7 and connecting shaft 9 using LORD CORPORATION bonding procedures and adhesives as is generally known in the art. Suitable equivalent bonding methods may be substituted therefore.

Elastomer tubing 8 inner and outer dimensions are chosen to provide a 10% preload of the tubular wall thickness and is also within the allowable stress limits of the elastomer for the required total stroke of exciter 2 and trough 1.

The length of the cylindrical elastomer spring 3 is determined by the spring stiffness in the shear direction required for the desired natural frequency of the two mass system but must also provide a natural frequency in the direction perpendicular to the shearing plane having a value 2½ to 3 times the natural frequency in the shear direction.

Exciter 2 is a three phase AC electric motor with double end shaft 13 and two eccentric weights on each end and the complete assembly is attached to mounting plate 4 by bolts 12. Eccentric weights 10 are fixed to motor shaft 13 and eccentric weights 10 are adjustable in an angular direction to vary the exciter force required to obtain the desired stroke of work member 1 at the set natural frequency.

FIG. 1 illustrates the cylindrical elastomer springs 3 positioned on single center beam 5 at a predetermined angle θ to the trough 1 that will have the vertical and horizontal acceleration required for efficient conveying of bulk material at a specific stroke and operating frequency.

For maximum efficiency, and maximum rate of conveying speed, the electric motor shaft 13 should be rotating in the opposite direction from the direction of conveying. In FIG. 1 the direction of conveying is to the right and the electric motor shaft 13 is rotating in the clockwise direction.

The weight of the exciter mass including items 2 and 4 can range from 20% to 100% the weight of the working member, items 1 and 5, depending on the stroke of the working member required for the application.

Depending on size and application of the Vibratory Device the most common operating frequency would be between 900 to 1800 CPM and the natural frequency of vibration would be 10% to 15% higher than the operating frequency.

CONCLUSION

A system and method has been shown in the above embodiments for the effective implementation of a center beam two mass vibratory device. While various preferred embodiments have been shown and described, it will be understood that there is no intent to limit the invention by such disclosure, but rather, it is intended to cover all modifications and alternate constructions falling within the spirit and scope of the invention as defined in the appended claims. The invention should not be limited by size, shape and/or materials.

I claim:

1. A two mass spring coupled vibrating system coupled to a work member comprising:
    a first mass comprising an exciter to produce vibratory work energy;
    a second mass having a work member including a single center beam with cylindrical elastomer springs mounted thereto, and
    wherein said cylindrical elastomer springs comprise first and second concentric cylinders encapsulating a tubular elastomer element.

2. A two mass spring coupled vibrating system as per claim 1, wherein said tubular elastomer element has a precompressed wall thickness greater than the radial distance between the cylinders.

3. A two mass spring coupled vibrating system as per claim 1, wherein said tubular elastomer element is bonded to said first and second concentric cylinders.

4. A two mass spring coupled vibrating system as per claim 1, wherein the cylindrical elastomer springs have a spring rate in the shear direction to provide a natural frequency 10% to 15% above an operating frequency of said exciter and a spring rate perpendicular to shear direction providing a natural frequency 2½ to 3 times that in the shear direction.

5. A two mass spring coupled vibrating system as per claim 1, wherein said work member is a vibratory feeder.

6. A two mass spring coupled vibrating system coupled to a work member comprising:
    a first mass comprising an exciter device to produce vibratory work energy,
    a plurality of cylindrical elastomer springs, each comprising:
        a pair of concentric cylinders encapsulating a tubular elastomer element therebetween;
        said tubular elastomer element having a precompressed wall thickness greater than the radial distance between said concentric cylinders;
        each of said tubular elastomer elements being bonded to its respective concentric cylinder, and
    a second mass having a work member including a single center beam with mounting means for said cylindrical elastomer springs.

7. A two mass spring coupled vibrating system as per claim 6, wherein said pair of cylinders comprises an outer and an inner cylinder and said outer cylinder is connected to said mounting means and said inner cylinder is connected to said exciter device.

8. A two mass spring coupled vibrating system as per claim 7, wherein said outer and inner cylinders are flanged to increase rigidity of said connections.

9. A two mass spring coupled vibrating system as per claim 6, wherein the cylindrical elastomer springs have a spring rate in the shear direction to provide a natural frequency 10% to 15% above an operating frequency of said exciter and a spring rate perpendicular to shear direction providing a natural frequency 2½ to 3 times that in the shear direction.

10. A two mass spring coupled vibrating system as per claim 6, wherein said work member is a vibratory feeder.

* * * * *